US011723505B2

(12) United States Patent
Goff

(10) Patent No.: US 11,723,505 B2
(45) Date of Patent: Aug. 15, 2023

(54) FLOOR MAINTENANCE MACHINE WITH DISCHARGE FUNNEL

(71) Applicant: RPS Corporation, Racine, WI (US)

(72) Inventor: Sean K. Goff, Breckenridge, CO (US)

(73) Assignee: RPS Corporation, Racine, WI (US)

( * ) Notice: Subject to any disclaimer, the term of this patent is extended or adjusted under 35 U.S.C. 154(b) by 132 days.

(21) Appl. No.: 17/181,696

(22) Filed: Feb. 22, 2021

(65) Prior Publication Data

US 2021/0259499 A1 Aug. 26, 2021

Related U.S. Application Data

(60) Provisional application No. 62/980,838, filed on Feb. 24, 2020.

(51) Int. Cl.
*A47L 11/40* (2006.01)
*A47L 11/30* (2006.01)

(52) U.S. Cl.
CPC .......... *A47L 11/4016* (2013.01); *A47L 11/30* (2013.01)

(58) Field of Classification Search
CPC .. A47L 11/4016; A47L 11/30; A47L 11/4013; A47L 11/4025; A47L 11/4044; A47L 11/4083; B29C 41/04; B29L 2031/712
See application file for complete search history.

(56) References Cited

U.S. PATENT DOCUMENTS 1,910,325 A * 5/1933 Finnell ................. A47L 11/408
 15/320
10,604,395 B1 * 3/2020 Yesnick ................... B67D 7/04

FOREIGN PATENT DOCUMENTS

GB 331631 * 5/1929

* cited by examiner

*Primary Examiner* — David Redding
(74) *Attorney, Agent, or Firm* — Quarles & Brady LLP

(57) ABSTRACT

A floor maintenance machine includes a clean fluid tank with a discharge funnel running therethrough that forms part of an exhaust pathway for a vacuum source. The vacuum source discharges an exhaust during operation of the machine from the exhaust outlet into the discharge funnel. The exhaust may be gaseous and/or include a liquid component in the case of a machine malfunction if liquid from a recovery chamber is non-ideally drawn into the vacuum source in the case a fail-safe does not work. The discharge funnel can provide a way for the liquid to exit the interior of the machine in such case.

13 Claims, 4 Drawing Sheets

FLOOR MAINTENANCE MACHINE WITH DISCHARGE FUNNEL

CROSS-REFERENCE TO RELATED APPLICATION

This application claims the benefit of U.S. provisional patent application No. 62/980,838 filed Feb. 24, 2020, which is hereby incorporated by reference for all purposes as if set forth in its entirety herein.

STATEMENT OF FEDERALLY SPONSORED RESEARCH OR DEVELOPMENT

Not applicable

BACKGROUND

This invention relates to equipment for floor maintenance machines and, in particular, to fluid collection systems for floor maintenance machines and exhaust pathways for the same.

Floor maintenance machines or scrubbers provide a way to clean dirty floor surfaces. Typically, an operator directs a floor maintenance machine over the surface to be cleaned by steering or guiding the floor maintenance machine. With the help of a supplied cleaning fluid, an oscillating pad or rotating brushes of the floor maintenance machine can directly contact the floor surface to loosen debris that is on the surface of the floor.

Generally, during cleaning, debris, fluid, and foam mixture is lifted from the floor into a recovery chamber using a fluid collection system. In such a system, a vacuum source creates a negative pressure in the recovery chamber and this negative pressure is used to draw fluid and some amount of gas from a squeegee or other collection point at the floor up into the recovery chamber.

SUMMARY

In the design of such floor maintenance machines, the use of a vacuum source—while necessary to facilitate fluid collection from the floor—can also create a handful of complications. Primary among these complications is that, because the vacuum source generates a loud noise while in operation, it is often desirable to place the vacuum source centrally within the body of the machine to muffle its noise during operation. Such central placement of the vacuum source, however, can create secondary complications in that during operation the vacuum source the vacuum source emits exhaust. While gaseous exhaust from the vacuum source may be potentially vented out of the machine during normal operation in almost any direction, further problems may arise if non-gaseous products are also emitted during operation. For example, even though the vacuum source is not designed to draw dirty liquid from the recovery chamber into the vacuum source—and, in fact, there may be one or more fail-safes in place prior to the vacuum source to prevent this from happening, because intake of liquid could be harmful to the vacuum source—such liquid intake may possibly occur anyway. If the intake of liquid into the vacuum source does occur, then that liquid will be discharged from the exhaust outlet of the vacuum source. However, because the central placement of the vacuum source within the floor maintenance machine, the unexpected discharge of liquid from the exhaust outlet of the vacuum source is potentially highly problematic. Among other things, the liquid may have nowhere to evacuate and may be expelled or collect in locations where liquid was never intended to be (e.g., on electronics) and/or which may impair the further efficient operation of the vacuum source. Still further, because that expulsion of liquid may be occurring internally and only during operation, it may be difficult for the operator to assess accurately the malfunction of the failsafe(s) and that liquid is being drawn through the vacuum source, making identification and resolution of the issue difficult.

Disclosed herein is an improved floor maintenance machine in which an improved exhaust pathway for the vacuum source is provided. That exhaust pathway includes an exhaust discharge funnel that is placed beneath the exhaust outlet of the vacuum source in which the exhaust discharge funnel is formed through one of the tanks that forms an internal volume for housing the vacuum source. In the unlikely event that a liquid is drawn into the vacuum source from the recovery chamber—which, again, is not expected or intended to happen—then the liquid, upon expulsion from the exhaust outlet of the vacuum source, is directed into the discharge funnel for transport from the internal volume housing the vacuum source to a location exterior to the floor maintenance machine. Still further, even when no liquid is being transported through the discharge funnel, the funnel plus any associated line or conduit may be used for transport of exhaust gases from the vacuum source.

According to one aspect, a floor maintenance machine includes a clean fluid tank having tank walls defining an internal tank volume, a discharge funnel formed in the clean fluid tank, a recovery chamber having a recovery chamber volume, and a vacuum source. The discharge funnel is formed on an exterior side of the tank walls of the clean fluid tank and extends through the internal tank volume from one side of the clean fluid tank to the other side of the clean fluid tank. The vacuum source is in fluid communication with the recovery chamber volume and has an exhaust outlet connected thereto that is positioned to discharge above and into the discharge funnel. The vacuum source is able to draw a vacuum in the recovery chamber volume during operation, which draws a mixture of at least one of a gas and a liquid into the recovery chamber from outside the floor maintenance machine. The vacuum source further discharges an exhaust from the exhaust outlet into the discharge funnel, which exhaust may be gaseous and/or include a liquid component in the case of machine malfunction.

In some forms, the floor maintenance machine may also include an internal space between the recovery chamber and the clean fluid tank. This internal space can house the vacuum source. In such case, the discharge funnel of the floor maintenance machine can have an outlet and the floor maintenance machine may further include a discharge tube coupled to the outlet. The discharge tube may connect the internal space to an external environment outside the floor maintenance machine. The discharge funnel may have, relatively speaking and in reference to one another, a large opening adjacent the internal space and a small opening defining the outlet. The small opening may be axially offset form the large opening.

In some forms, the discharge funnel of the floor maintenance machine may be integrally formed with the clean fluid tank and defined by the tank walls. In such case, it is contemplated that the clean fluid tank may be formed through a rotomolding process, for example, although other formation processes could also be employed.

In some forms, the discharge funnel may be asymmetrical about at least one axis.

According to another aspect, a clean fluid tank for a floor maintenance machine is provided. The clean fluid tank includes tank walls defining an internal volume and further includes a discharge funnel. The discharge funnel is formed on an exterior side of the tank walls and extends through the internal tank volume from one side of the clean fluid tank to another side of the clean fluid tank.

In some forms, the discharge funnel of the clean fluid tank may have an outlet configured to or adapted to be coupled to a discharge tube. The discharge funnel may have, relatively speaking and in reference to one another, a large opening opposite and axially offset from a small opening defining the outlet. The small opening may be axially offset form the large opening.

In some forms, the discharge funnel of the clean fluid tank may be integrally formed within the clean fluid tank and defined by the tank walls. Again, in such case, the clean fluid tank may be formed through a rotomolding process.

In some forms, the discharge funnel may be asymmetrical about at least one axis.

According to yet another aspect, a method for discharging exhaust from a floor maintenance machine is provided. A mixture of at least one of a gas and a liquid from the floor is drawn into a recovery chamber of the floor maintenance machine using a vacuum source. Exhaust is discharged from the vacuum source with the exhaust including at least a portion of the mixture drawn into the recovery chamber and exits the floor maintenance machine through a discharge funnel in a clean fluid tank of the floor maintenance machine. The discharge funnel is formed on an exterior side of the tank walls of the clean fluid tank and extends through the internal tank volume from one side of the clean fluid tank to another side of the clean fluid tank.

In some forms, the discharge funnel may have an outlet and the method may further include discharging the exhaust from the floor maintenance machine through a discharge tube coupled to the outlet.

In some forms, the vacuum source may have an exhaust outlet located over the discharge funnel and the method may further include discharging exhaust through the exhaust outlet and down into the discharge funnel.

In some forms, the discharge funnel may be integrally formed with the clean fluid tank.

In some forms, the discharging step may be aided by gravity.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION OF THE PREFERRED EMBODIMENTS

Figure 1:
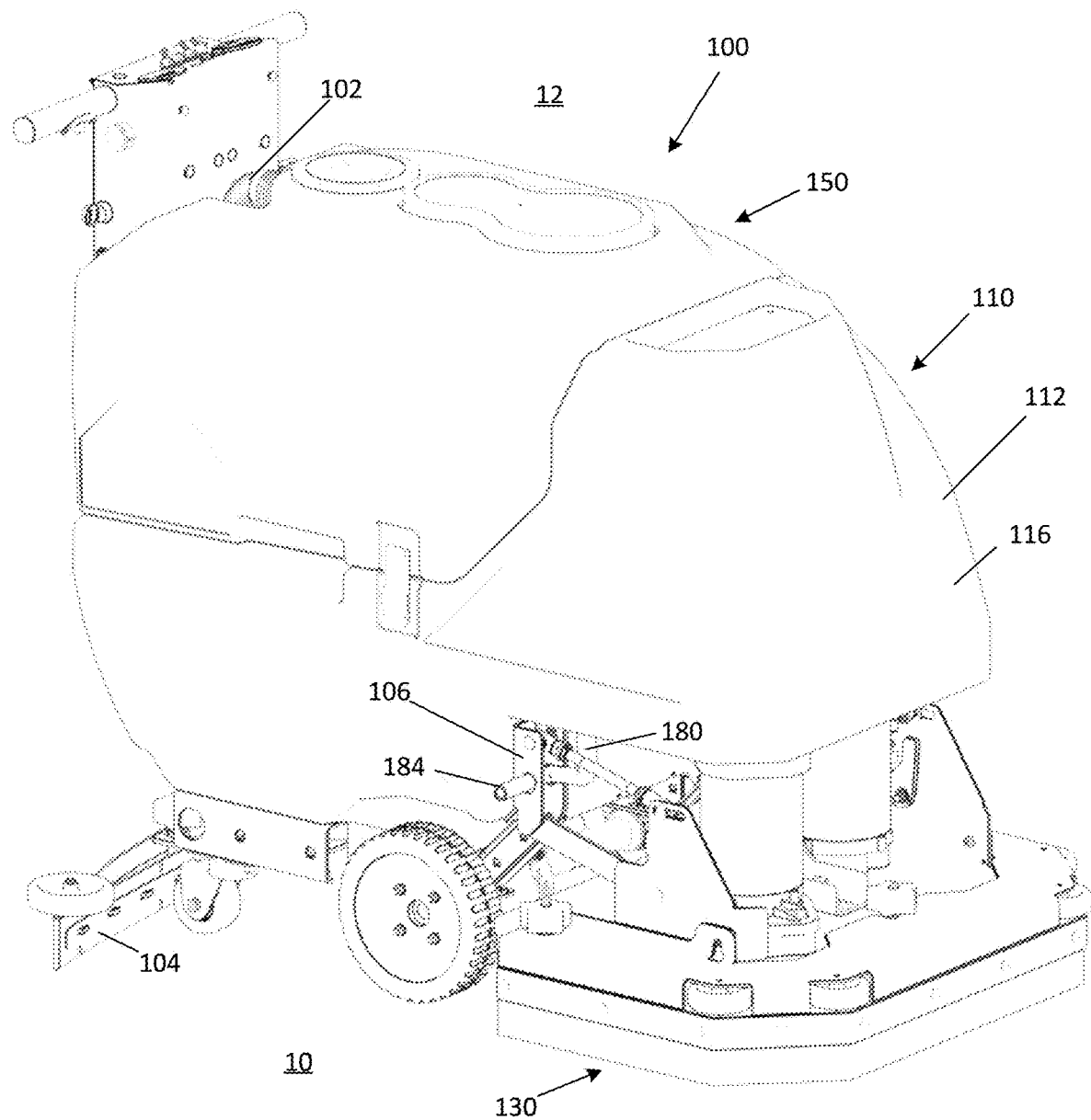
FIG. 1 is a top front left perspective view of a floor maintenance machine having an improved exhaust pathway.
Figure 2:
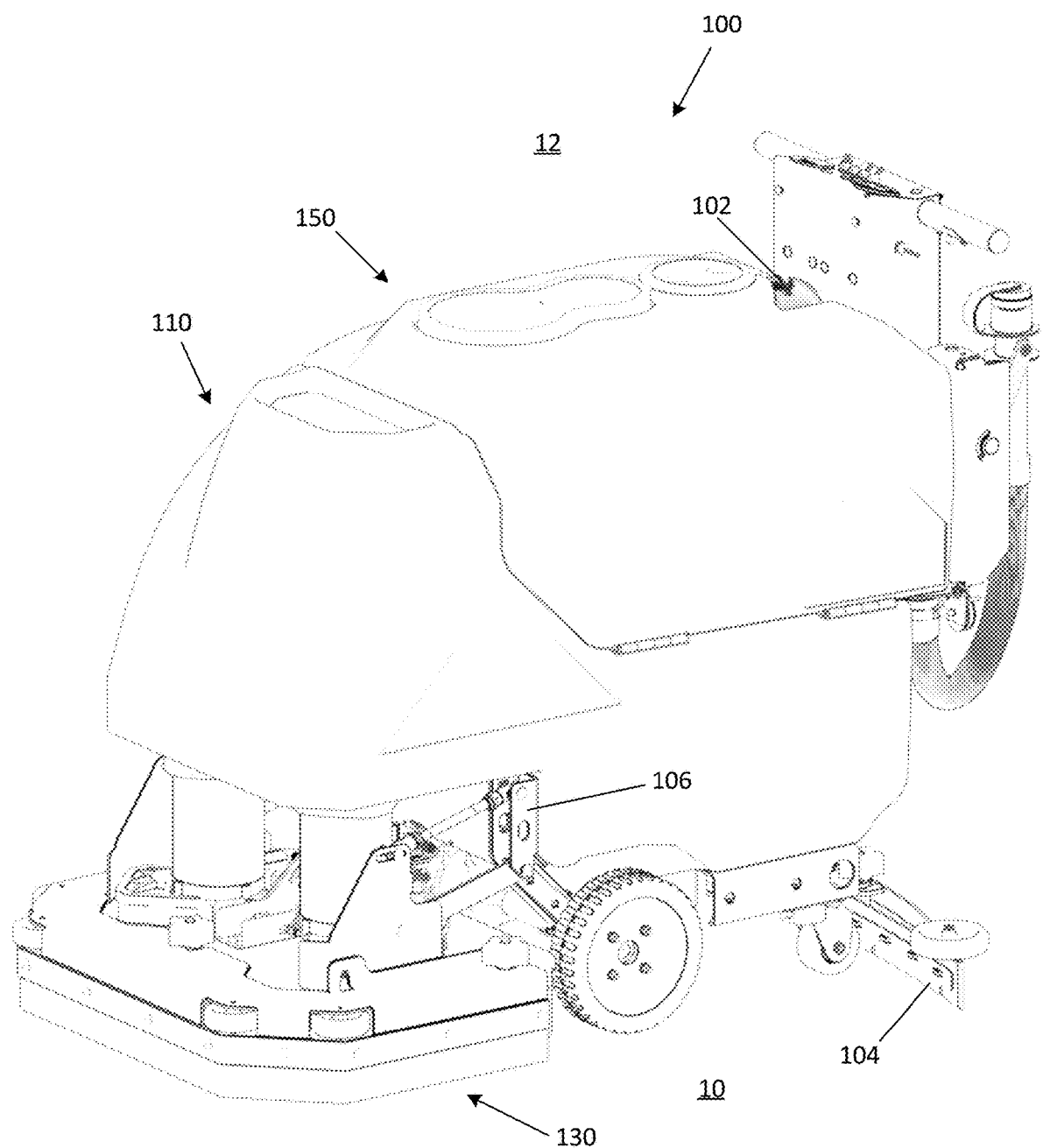
FIG. 2 is a top front right perspective view of the floor maintenance machine of FIG. 1.
Figure 3:
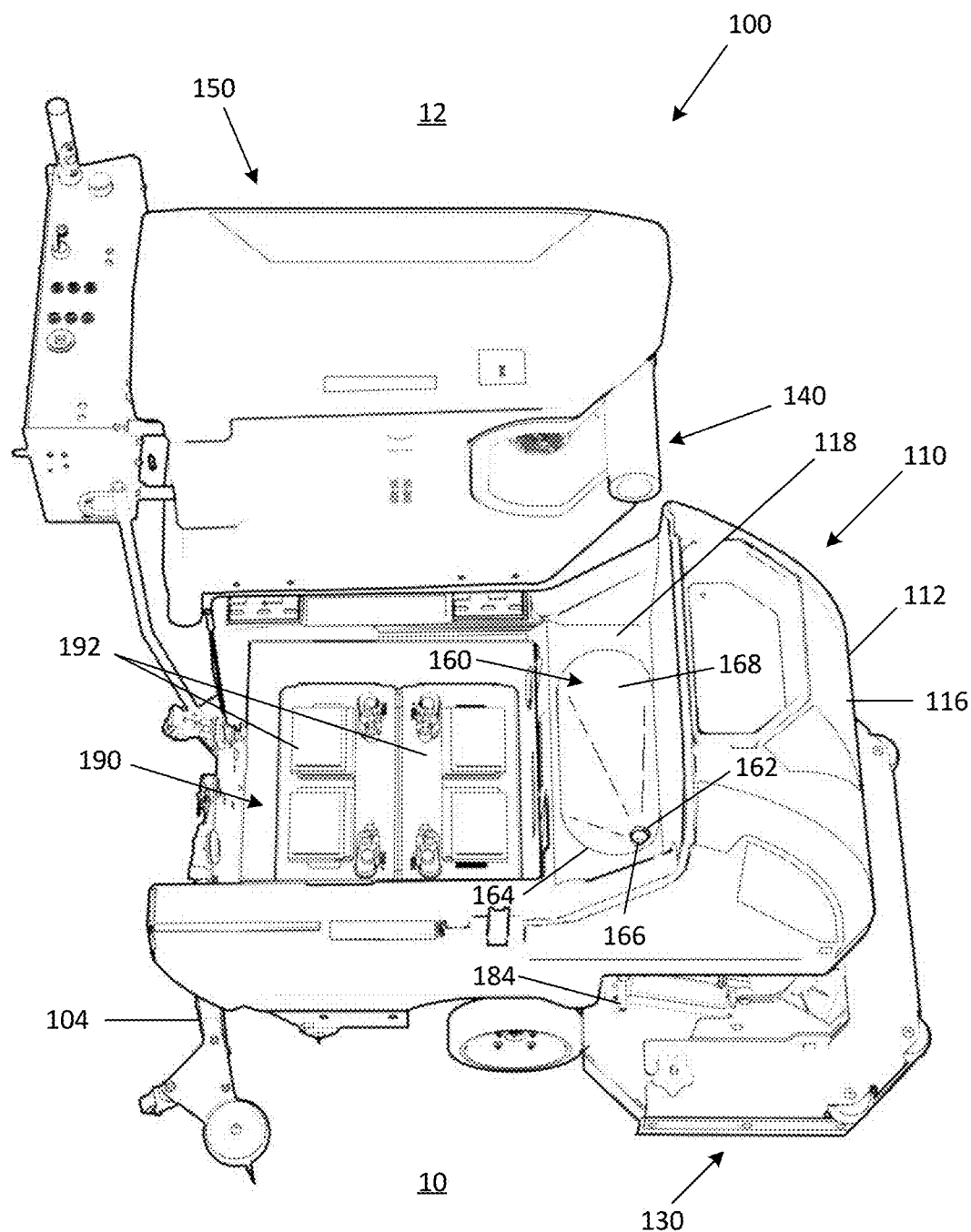
FIG. 3 is a top left side perspective view of the floor maintenance machine of FIG. 1 with a recovery chamber rotated away from a clean fluid tank to expose a discharge funnel that forms part of the exhaust pathway.

FIGS. 1-3 show an embodiment of a floor maintenance machine 100 as described herein that is configured to clean/wash a floor 10. The floor maintenance machine 100 is a walk-behind floor scrubber, generally similar in operation to (but not exactly identical to) the floor maintenance machine of U.S. patent application publication no. 2016/0331201 published on Nov. 17, 2016, which is incorporated herein by reference for all purposes. However, the floor maintenance machine 100 could potentially be any kind of floor maintenance machine 100 including both walk-behind or riding-type floor maintenance machines.

The floor maintenance machine 100 includes a clean fluid tank 110, a brush assembly 130 (which could potentially be disc or cylindrical brushes for example), and a vacuum source 140 that is in communication with a recovery chamber 150 (or dirty water recover tank) to draw a vacuum therein. The recovery chamber 150 is also in communication with an external environment 12 via a hose 102 (perhaps best seen in FIG. 4 in full) that extends from a collection squeegee 104 adjacent the floor 10 to the recovery chamber 150 to suck in dirty fluid and debris after brushing/cleaning.

As illustrated, the recovery chamber 150 and the vacuum source 140 are coupled together and are hingedly attached to the clean liquid tank 110 and movable between a closed position (FIGS. 1 and 2) and an open position (FIG. 3). This allows ease of access to a battery chamber 190, which houses a set of batteries 192 that power the floor maintenance machine 100.

Figure 4:
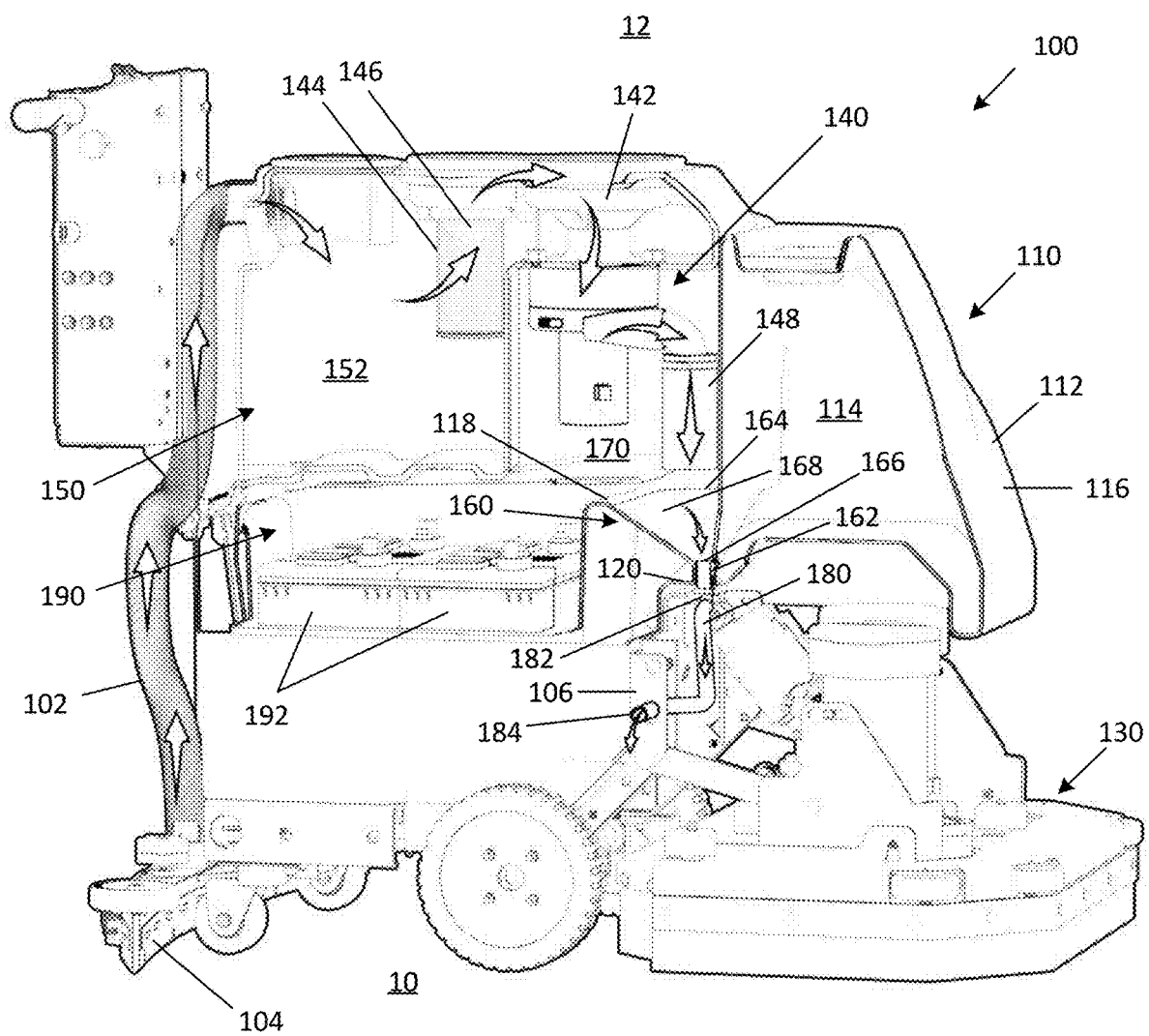
FIG. 4 is a partial cut away view of the floor maintenance machine of FIG. 1 with a section of the recovery chamber and a section of the clean fluid tank removed to better illustrate the use of the vacuum source to collect fluid from the floor into the recovery chamber and to emit vacuum source exhaust.

Generally, during a floor cleaning operation, a liquid is released from the clean fluid tank 110 and onto the floor 10 in the vicinity of the brush assembly 130. The brush assembly 130 works and agitates the liquid as the brush assembly 130 brushes the floor 10 to remove any dirt and debris that may be on the surface of the floor 10. When the vacuum source 140 is activated during the floor cleaning operation and the machine 100 is advanced forward, the vacuum source 140 draws a combination of gas, liquid, foam, and/or debris into the recovery chamber 150 from the opening of the hose 102 near the collection squeegee 104 by drawing a negative pressure in the recovery chamber 150 using the vacuum source 140. FIG. 4 shows the path of the gas, liquid, foam, and/or debris from the floor 10 into the recovery chamber 150 with arrows which then further continue on to shows the continued path of the gas drawn from the recovery chamber 150 through the vacuum source 140 and into the external environment 12. To both maintain a robust vacuum and to reduce the ingress of liquid, foam, or debris drawn into the vacuum source 140, the hose 102 and the intake 142 of the vacuum source 140 are elevated within a recovery chamber volume 152 of the recovery chamber 150, with the collected dirty liquid and debris that has been collected accumulating at the bottom of the volume 152.

There are fail-safes to prevent debris or liquid from entering the vacuum source 140 during typical operation. For example, the intake 142 provides a path between the recovery chamber 150 and the vacuum source 140 through which the vacuum source 140 draws the vacuum, and, to prevent ingress of solid debris into the vacuum source 140, a filtration screen 144 is positioned near the intake 142. To prevent the intake of dirty fluid from the recovery chamber 150 into the vacuum source 140, a ball float valve 146 is positioned to block the line or path from the recovery chamber 150 to the vacuum source 140 when the liquid level is raised within the recovery chamber 150 has reached a predetermined maximum level. Although not present in the illustrated embodiment, other applications by the same Applicant (the aforementioned U.S. patent application publication no. 2016/0331201) have also proposed the use of an intermediate hollow structure between the recovery chamber the vacuum source with a valved low point to capture any dirty liquid that has unexpectedly passed the initial ball valve failsafe point prior to entering the vacuum source, where that dirty liquid might cause damage.

Nonetheless, despite the location of the intake 142, the employment of the float valve 146, and potentially other fail-safes, in some instances unwanted liquid may passes into the vacuum source 140 along with gas used to draw the vacuum. When liquid enters the vacuum source 140, it can have a severe negative effect on the vacuum created and potentially even damage the vacuum source 140. Still further and as mentioned above, such liquid may be unexpectedly discharged into the interior of the machine 100, which houses other electronics and components are to be kept dry. Apart from damage to the floor cleaning machine 100, if the vacuum source 140 is compromised, then the liquid that is dispensed from the clean fluid tank 110 onto the floor 10 for cleaning may not be fully drawn into the recover chamber 150 and portions of the floor 10 may remain wet with dirty cleaning fluid containing debris remaining on the floor 10.

That said, it is herein recognized that if and once liquid reaches the vacuum source 140, it is advantageous to discharge it in the safest and cleanest way possible and ideally in a way that will alert the operator that the liquid has undesirably entered the vacuum source 140. Liquid that enters the vacuum source 140 typically would exit, along with the gas, through an exhaust outlet 148 of the vacuum source 140. The exhaust outlet 148 provides a direct path for the exhaust (whether purely gaseous or including some amount of liquid) to exit the vacuum source 140. As illustrated, the exhaust outlet 148 is also wrapped with sound dampening material to reduce the noise created by the vacuum source 140.

As shown in FIG. 4, the vacuum source 140 can be located within an internal space 170 that is between the recovery chamber 150 and the clean fluid tank 110. Among other things, centrally locating the vacuum source 140 between the two tanks can help muffle the overall operational noise of the vacuum source 140. However, generally and in this arrangement, liquid exiting the exhaust outlet 148 would have nowhere to go and would likely stay within the floor maintenance machine 100, possibly finding its way into the battery chamber 190 or other problematic spaces.

To solve this concern of liquid discharge and collection from the exhaust outlet 148 of the vacuum source 140, FIGS. 3 and 4 illustrate a discharge funnel 160 to direct liquid and other materials (e.g., gas as is standardly discharged) to the external environment 12. Notably, the discharge funnel 160 is formed on an exterior side 116 of the tank walls 112 of the clean fluid tank 110 (i.e., the tank walls 112 define the shape of the discharge funnel 160) which would otherwise be a barrier to a fluid conduit or exhaust pathway out of the internal space 170. The discharge funnel 160 extends through the internal tank volume 114 of the clean fluid tank 110 from one side (e.g., a top side 118) of the clean fluid tank 110 to another side (e.g., a bottom side 120). In some embodiments, the discharge funnel 160 can be integrally formed with the clean fluid tank 110 whereby the tank walls 112 form the sidewalls 168 or profile of the discharge funnel 160. Because the clean water tank 110 is a generally hollow body, in some embodiments, the clean fluid tank 110 and the discharge funnel 160 can be formed through a rotomolding process that may be used to make such large, hollow bodied plastic components. Alternatively, the discharge funnel 160 could be formed independently from the clean fluid tank 110 and installed within and through an opening in the clean fluid tank 110.

The discharge funnel 160 has a large opening 164 at the top side 118 of the clean fluid tank 110 and adjacent the internal space 170. The large opening 164 has a round, bowl-like shape as illustrated, but other profiles could be used. The discharge funnel 160 is positioned below the exhaust outlet 148 of the vacuum source 140 when the recovery chamber 150 is in the closed position so that any exhaust, whether gas or liquid, is directed toward and into the discharge funnel 160.

At the bottom side 120 of the clean fluid tank 110, the discharge funnel 160 has a small opening defining an outlet 166. In some embodiments, the outlet 166 can extend downward to form a channel 162. The channel 162 may have internal threads to receive a coupling 182.

In some embodiments, the discharge funnel 160 can be asymmetrical about at least one axis. For example, the outlet 166 can be axially offset from the large opening 164. In some embodiments, the outlet 166 can be axially aligned with the exhaust outlet 148 when the recovery chamber 150 is in the closed position as shown in FIGS. 3 and 4. The axial offset of the outlet 166 relative to the large opening 164 can be at least one of a side-to-side offset or a front-to-back offset. In some embodiments, the side-to-side offset can position the outlet 166 closer to the side of the floor maintenance machine 100 on which the exhaust (whether gas and/or liquid) is discharged to the external environment 12. In some embodiments, the shape and size of the discharge funnel 160 can be configured to accommodate internal or external features (e.g., frame members, other internal compartments, optimal location of a discharge tube 180 (discussed below), etc.).

The large opening 164 is sized to catch liquid discharged from the exhaust outlet 148 as part of an exhaust mixture of gas and liquid. The liquid may enter the discharge funnel 160 under force from at least one of force created by the vacuum source 140 as the liquid exits the exhaust outlet 148 and the force of gravity. From the large opening 164 to the outlet 166, the discharge funnel sidewalls 168 have a linear slope between the large opening 164 and the outlet 166. The slope encourages the collection of any liquid as it is discharged from the exhaust outlet 148. In some embodiments, the slope can have a curved profile.

The discharge tube 180, with a discharge tube outlet 184, is coupled to the coupling 182 that is attached to the outlet 166 of the discharge funnel 160. The discharge tube 180 routes the exhaust (whether gas and/or liquid) from the internal space 170 to the external environment 12. In some embodiments, the discharge tube 180 can be directly coupled to the outlet 166. In other embodiments, the discharge tube 180 could be integrally formed with the discharge funnel 160. The discharge tube 180 extends from the coupling 182 through a portion of the frame 106 of the floor maintenance machine 100. In some embodiments, the discharge tube 180 is flexible to allow easy bending of the discharge tube 180 when routing from the discharge funnel 180 through the frame 106. The frame 106 supports and protects the discharge tube 180 to reduce the likelihood of damage and decoupling of the discharge tube 180 from the coupling 182. The discharge tube 180 directs the discharged liquid and gas to the external environment 12 through the discharge tube outlet 184 where the liquid can fall to the floor 10 to again be drawn into the recovery chamber 150 by the vacuum source 140 or placed conspicuously in a location where the operator can see that its discharge is occurring. In other embodiments, it is contemplated the discharge tube 180 can extend to other areas below the floor maintenance machine 100, including directly below the vacuum source 140 and behind the brush assembly 130.

Notably, the discharge tube 180 desirably only extends downwardly from the discharge funnel 160 to its final outlet. This is meaningful in that any low points could potentially create a "trap" where liquid could collect and seal the tube 180 from the environment 12.

During operation, a mixture of dirty liquid and environmental gas is drawn into the recovery chamber 150 of the floor maintenance machine by vacuum created by the vacuum source 140. During the creation of this negative pressure, the vacuum source 140 draws gas from the recovery chamber 150 and exhausts or discharges it as exhaust from exhaust outlet 148. Again, in the case that the liquid level in the recovery chamber 150 gets too high and the fail-safes do not deploy, then it is possible that liquid may also be drawn into the vacuum source 140. Such exhaust (whether liquid or gas) is then exhausted into the discharge funnel 160 where it is routed through the funnel and out any discharge tube 180 to the surrounding environment 12. In this way, any liquid can be advantageously evacuated from the system and machine, even though the vacuum source 140 is captured in an internal space 170 between two large tanks.

Thus, an improved fluid discharging system and exhaust pathway for a floor maintenance machine is disclosed. By incorporating a discharge funnel within and through a clean fluid tank of the floor maintenance machine, liquid entering the vacuum source as part of a mixture of liquid and gas can be discharged through an exhaust outlet of the vacuum source and directed to the external environment through the discharge funnel.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A floor maintenance machine comprising:
   a clean fluid tank with tank walls defining an internal tank volume;
   a discharge funnel formed on an exterior side of the tank walls of the clean fluid tank;
   a recovery chamber defining a recovery chamber volume; and
   a vacuum source in fluid communication with the recovery chamber volume, the vacuum source having an exhaust outlet connected thereto that is positioned to discharge above and into the discharge funnel;
   an internal space between the recovery chamber and the clean fluid tank, the internal space housing the vacuum source;
   wherein the vacuum source draws a vacuum in the recovery chamber volume which draws a mixture of at least one of a gas and a liquid into the recovery chamber from outside the floor maintenance machine and discharges an exhaust from the exhaust outlet into the discharge funnel.

2. The floor maintenance machine of claim 1, wherein the discharge funnel has an outlet and the floor maintenance machine further comprises a discharge tube coupled to the outlet.

3. The floor maintenance machine of claim 2, wherein the discharge tube connects the internal space to an external environment outside the floor maintenance machine.

4. The floor maintenance machine of claim 2, wherein the discharge funnel has a large opening adjacent the internal space and a small opening defining the outlet.

5. The floor maintenance machine of claim 4, wherein the small opening is axially offset from the large opening.

6. The floor maintenance machine of claim 1, wherein the discharge funnel is integrally formed with the clean fluid tank and defined by the tank walls.

7. The floor maintenance machine of claim 6, wherein the clean fluid tank is formed through a rotomolding process.

8. The floor maintenance machine of claim 1, wherein the discharge funnel is asymmetrical about at least one axis.

9. A method for discharging exhaust from a floor maintenance machine, the method comprising:
   drawing a mixture of at least one of a gas and a liquid from a floor into a recovery chamber of the floor maintenance machine using a vacuum source; and
   discharging exhaust from the vacuum source with the exhaust including at least a portion of the mixture drawn into the recovery chamber, in which the exhaust exits the floor maintenance machine through a discharge funnel in a clean fluid tank of the floor maintenance machine, wherein the discharge funnel is formed on an exterior side of the tank walls of the clean fluid tank.

10. The method of claim 9, wherein the discharge funnel has an outlet and the method further comprises discharging the exhaust from the floor maintenance machine through a discharge tube coupled to the outlet.

11. The method of claim 9, wherein the vacuum source has an exhaust outlet located over the discharge funnel and the method further comprises discharging exhaust through the exhaust outlet and down into the discharge funnel.

12. The method of claim 9, wherein the discharge funnel is integrally formed with the clean fluid tank.

13. The method of claim 9, wherein the discharging step is aided by gravity.

* * * * *